April 14, 1942.    N. M. THOMAS    2,279,801
PORTABLE STICK MANIPULATOR
Filed June 10, 1941    2 Sheets-Sheet 1
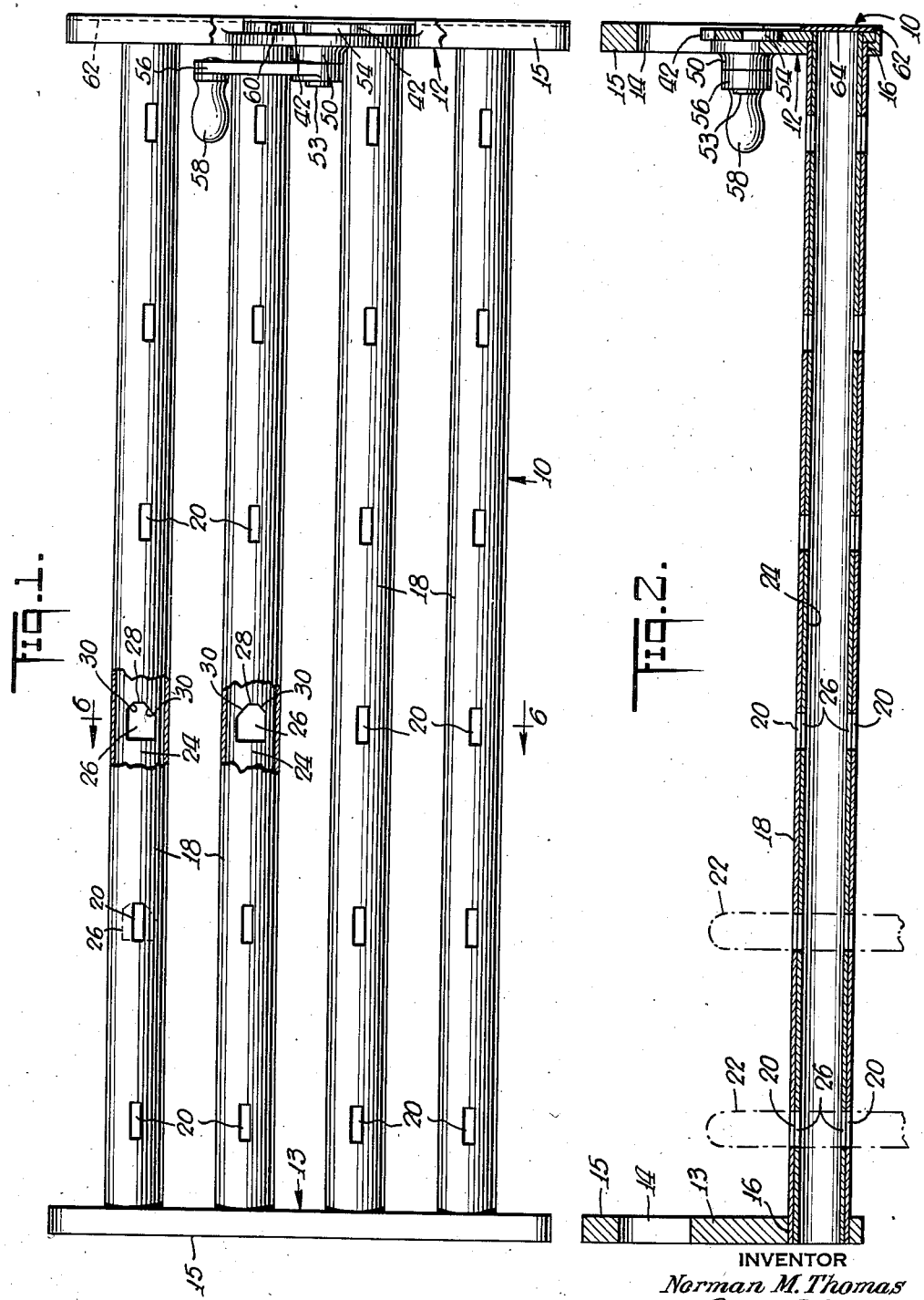
INVENTOR
Norman M. Thomas
BY
ATTORNEY

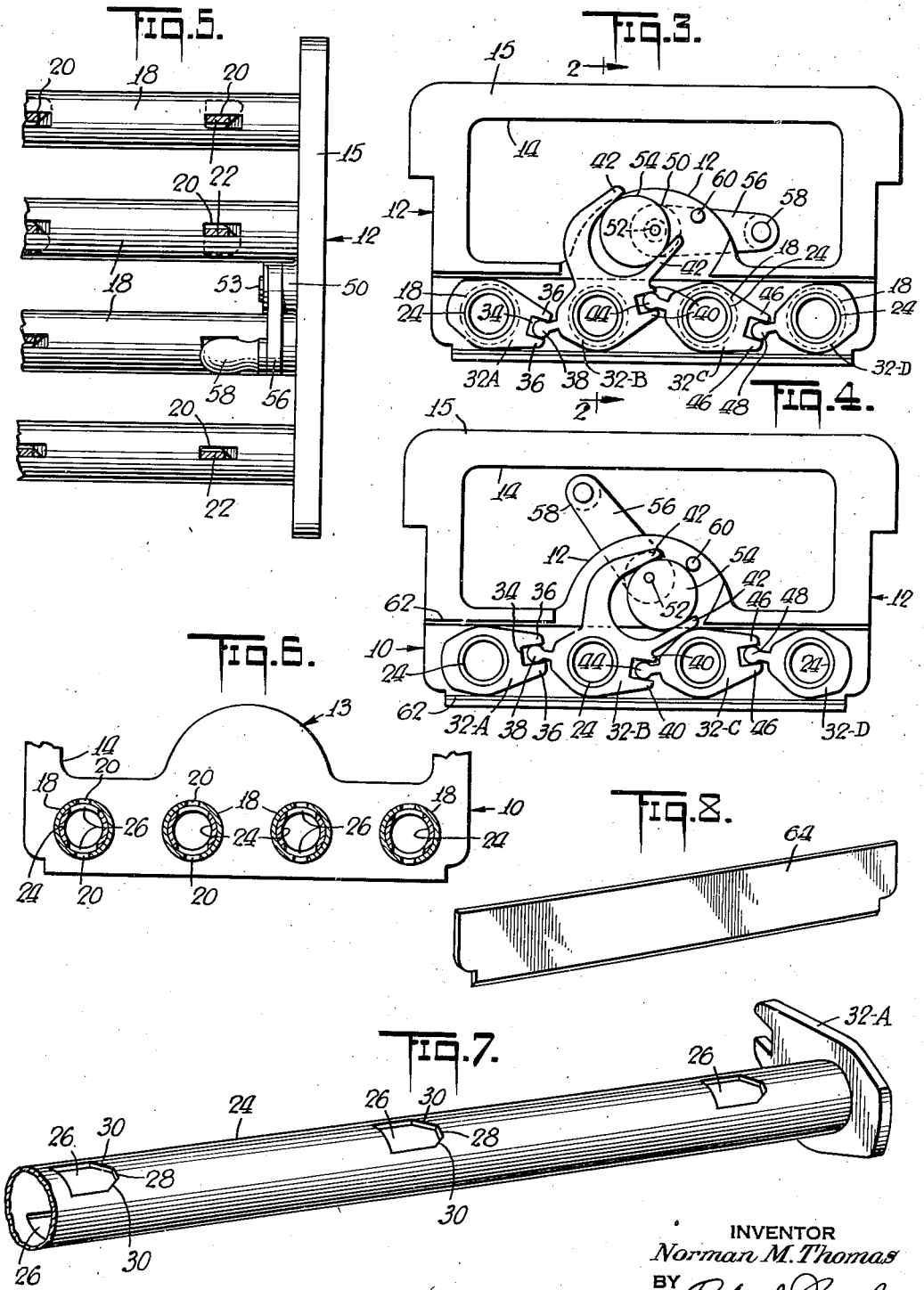

Patented Apr. 14, 1942

2,279,801

UNITED STATES PATENT OFFICE 2,279,801

PORTABLE STICK MANIPULATOR

Norman M. Thomas, Medford Lakes, N. J., assignor to Joe Lowe Corporation, New York, N. Y., a corporation of Delaware Application June 10, 1941, Serial No. 397,375

16 Claims. (Cl. 294—87)

The present invention relates to improvements in apparatus for simultaneously locking, manipulating and releasing a plurality of handle members, such as wooden handle sticks of the type used extensively in the candy and ice cream industries, in the manufacture of stick confectionery products, and it has particular relation to a portable type of tubular stick receiving carrier adapted to receive, position, lock, manipulate and release a plurality of such handle members simultaneously in an efficient, economical and sanitary manner.

With the present invention I have provided a simple inexpensive and durable portable stick handling device of a highly sanitary construction, which is adapted especially for holding a plurality of handle members in vertical spaced relation for positioning one of them centrally within each of the cavities of a multi-cavity mold of conventional construction.

An object of the present invention is to provide a simple, inexpensive and durable portable stick handling device, which will positively engage and hold clampingly a plurality of spaced handle members in a vertical position regardless of variations in their dimensions.

Another object of the invention is the provision of a portable stick handling device which will positively engage a plurality of handle members positioned therein with a three sided wedging contact which will cause them to be secured in vertical alignment in a predetermined spaced arrangement.

A further object of the invention is to provide a simple, inexpensive and durable portable stick handling device consisting of a main frame structure having a plurality of separable members which may be quickly and easily disassembled for cleaning purposes, and thereafter readily reassembled without requiring the use of any tools, the unloosening or tightening of any screws, bolts or other fastening means, etc. to accomplish the desired result.

Another object of the invention is the provision of a simple, efficient and sanitary portable stick handling device consisting of a main frame structure having a plurality of readily separable members that are substantially free of inaccessible corners which can collect and harbor dirt, bacteria, germs, etc., and which are entirely free of mechanisms requiring adjustment, and capable of rapid and thorough cleaning.

A further object of the invention is to provide a simple, practical, rugged and durable portable stick handling device which is exceedingly light in weight; capable of convenient operation; assembly and disassembly with little effort by unskilled operators; incapable of jamming or otherwise getting out of order; devoid of mechanisms requiring lubrication; and capable of convenient, quick, and thorough cleaning to maintain the high standards of sanitation desired.

Other and further objects and advantages of the invention reside in the detailed construction of the device, which result in simplicity, economy and efficiency, and which will be apparent from the following description, wherein like numerals indicate like parts, in which:

Fig. 1 is a top plan view of an assembled portable stick handling device made in accordance with the principles of my invention, with parts being broken away for the purpose of showing the relationship of the holes when in an open position for receiving handle sticks;

Fig. 2 is a longitudinal sectional view of the assembled stick holder shown in Fig. 3, the same being taken substantially along the line 2—2 thereof, looking in the direction of the arrows;

Fig. 3 is an end elevational view of the assembled stick holder shown in Fig. 1, with the end cover plate removed to show the operating mechanism in its open or stick receiving and releasing position;

Fig. 4 is another end elevational view of the assembled stick holder shown in Fig. 1, with the end cover plate removed to show the operating mechanism in its stick locking position.

Fig. 5 is a fragmentary plan view of the assembled stick holder shown in Fig. 4, showing the relative position of the openings when in its stick locking position Fig. 6 is a cross-sectional view of the apparatus shown in Fig. 1, the same being taken along the line 6—6 thereof, looking in the direction of the arrows;

Fig. 7 is an enlarged perspective view of one of the tubular inner separable members adapted to be inserted within the main frame structure of the stick handling apparatus; and Fig. 8 is a perspective view of the end cover plate, which is best shown in position in Fig. 2.

Referring now to the drawings, there is shown in Fig. 1, a main frame structure 10, having a pair of end frame members 12 and 13. The upper parts of the end frame members 12 and 13 are cut out as indicated at 14 to provide a pair of spaced handles 15 by which the apparatus may be carried and/or otherwise manipulated. A plurality of openings 16 are spaced adjacent the lower solid portion of the end frame members 12 and 13, as best shown in Fig. 2. A plurality of elongated tubular members 18 are mounted fixedly in said openings 16. Each tubular member 18 is provided with a series of longitudinally spaced openings 20 extending vertically and diametrically therethrough. The openings 20, in the arrangement shown, are of a rectangular shape, and of a size slightly larger than the handle sticks 22 which are adapted to be manipulated thereby. It is to be understood, of course, that the openings 20 may be of any desirable shape, depending preferably upon the shape of the handle stick to be manipulated thereby, without departing from the spirit of the invention.

Each of the tubular members 18 is provided with a telescopically fitted inner tubular member 24, one of which is shown perspectively in Fig. 7. The telescopic tubular members 24 are adapted to be freely mounted concentrically within the tubular members 18, and are provided with a series of longitudinally spaced openings 26 extending diametrically therethrough, which openings 26 are so positioned as to be vertical with respect to the members 18 when the apparatus is in its normal or open stick receiving position. It will be noted that the spacing of the openings 26 of the telescopical tubular members is similar to the spacing of the openings 20 of the tubular members 18 so as to be movable into vertical alignment therewith for receiving the handle sticks 22. Each of the openings 26 is considerably larger than the corresponding openings 20, and has one end 28 of truncated triangular shape to provide oblique edges 30, which serve to bind the handle members 22 against at least two opposite sides of the opening 20, when the tubular members are moved relatively, as best shown in Fig. 5.

Each of the tubular members 24 is provided adjacent one end with a fixed transversely extending horizontal dog. Each dog is provided with a slightly different construction for connecting them operatively together, as best shown in Figs. 3 and 4, and for convenience in reference therefor are designated separately by the numerals 32—A, 32—B, 32—C and 32—D. The dog 32—A is bifurcated along one side to provide a pair of spaced prongs or fingers 36 for operatively engaging a member projecting outwardly from the next adjacent side of the next adjacent dog 32—B, which projection member may be conveniently termed a cam. The dog 32—B has a projecting cam 38 extending outwardly from its outer side toward the dog 32—A, a pair of projecting prongs 40 extending away from its opposite side and inwardly of the apparatus, and extending upwardly from its top side there is an integrally formed pair of spaced shifting levers or fingers 42. The dog 32—C has a projecting cam 44 extending outwardly from its inner side and toward the dog 32—B, and a pair of projecting prongs 46 extending outwardly and away from its outer side, toward the dog 32—D. The dog 32—D is provided merely with a cam member 48 projecting outwardly from its inner side toward the dog 32—C.

The end frame 12 has a boss 50 formed integrally therewith, which is provided with an opening for receiving and journaling a shaft 52 therein. The shaft 52, which is rotatably journaled in the opening provided through the boss 50, has a circular cam member 54 mounted eccentrically on its end projecting outwardly of the apparatus, the cam member 54 being keyed or otherwise fixed to the shaft 52 in any suitable manner. The opposite or inner end of the shaft 52, which has an enlarged flanged head 53 has an operating lever 56 keyed or otherwise fixedly mounted thereon, which lever 56 is provided with a suitable crank handle 58 for rotating the assembled structure. A stop 60 is mounted on the outer side of the end member 12 to provide means for limiting movement of the handle 58 and its cam 54 in a counterclockwise direction in order that the handle 58 will be maintained in an operative position with the handle 15 when the handle sticks 22 are locked therein. The handle sticks 22, in this arrangement, may be released from the apparatus by the operator by the fingers of the hand of the operator while the handle 15 is held in the palm thereof. It will thus be seen that the handle sticks 22 and their appended confectionery products (not shown) may be released for packaging without the necessity of the operator setting the apparatus down to effect their release.

It will also be noted that the lower portion of the end frame 12 is channeled, as indicated at 62, to provide grooves which act as means for receiving frictionally a slidable cover plate 64, which is best shown in Fig. 8. The plate 64, when in its proper assembled position, as best shown in Fig. 2, encloses completely the operating arrangement of the dogs 32—A, 32—B, 32—C and 32—D.

To operate the apparatus, it will be assumed that the handle member 58 is moved into its open or stick receiving position in which it is moved as far to the right, or clockwise, as possible, as best shown in Fig. 1. In this position the arrangement of the dogs 32—A, 32—B, 32—C and 32—D is that shown in Fig. 3, and the tubular members 18 and 24 are in the position shown in Fig. 6, with the pairs of openings 20 and 26 being in vertical alignment for reception of the handle sticks 22. The handle sticks 22 are inserted either manually or by any suitable stick feeding machine, as desired, while the apparatus is supported on a conventional stick gauging table (not shown).

After a stick 22 has been inserted into each group of aligned apertures 20 and 26, the handle member 58 is moved to the left of the apparatus or counter-clockwise to the position shown in Fig. 4. Movement of the handle 58 causes the cam member 54 to be moved downwardly, which in turn moves the shifting fingers 42 downwardly, causing rotation of the dog 32—B in a clockwise direction and the tubular member 24 fixedly secured thereto relative to its tube 18. The cam 38 on the dog 32—B moves the fingers 34 upwardly, causing counter-clockwise rotation of the dog 32—A, which in turn moves its tubular member 24 fixedly secured thereto relative to its fixed tube 18. Movement of the dog 32—B in a clockwise direction also moves the integral fingers 40 in the same direction, which engage the cam 44 of the dog 32—C, moving it in a counter-clockwise direction, causing its tubular member 24 to be moved relative to its fixed tube 18. The movement of the dog 32—C in a counter clockwise direction moves its integral fingers 46 in the same direction, and they engage the cam 48 of the dog 32—D, moving it in a clockwise direction, causing its fixed tubular member 18 to be moved relative to its fixed tube 18. It will be readily apparent that these operations are reversed when the handle member 58 is moved in the opposite direction.

With movement of the handle member 58 from its open or stick receiving position, which is best shown in Figs. 3 and 6, the inner telescopic movable tubular members 24 are each rotated relative to their outer fixed tubular members 18, causing the diametrically spaced openings 26 to be moved out of alignment with the openings 20, as best shown in Figs. 4 and 5. By truncating the one end of the openings 26, two oblique sides 30 are provided which are capable of engaging a corner of the handle member 22 and forcing it wedgingly against the diagonally opposite end and side of the opening 20. While it is obvious that only one oblique side 30 engages a handle stick 22 at a time, but several of the tubes 24 are moved in opposite directions, which means that their openings 26 must be symmetrical to permit interchanging the tubes during the process of manufacture up to the point where the dogs 32 are fixed thereon. This particular type of wedging action gives a three point contact with the stick at two spaced points, both at the top and bottom of the tubes 18 and 24, with the result that the sticks 22 are perfectly aligned vertically with respect to the apparatus, thus assuring vertical positioning of the handle members in their respective mold cavities.

Although I have only described in detail one form which my invention may assume, it will be apparent to those skilled in the art that the invention is not so limited, but that various modifications may be made therein without departing from the spirit thereof or from the scope of the appended claims.

What I claim is:

1. A stick manipulator comprising a main frame structure having a main tubular member provided with a series of longitudinally spaced openings extending therethrough, a second tubular member adapted to be mounted concentrically of said main tubular member and having a series of correspondingly spaced openings extending therethrough and means for causing rotation of said tubular members relative to one another for varying the alignment of their respective openings.

2. A stick manipulator comprising a main frame structure having a main fixed tubular member provided with a series of longitudinally spaced openings extending diametrically therethrough, a second separable tubular member adapted to be freely mounted concentrically within said main tubular member and having a series of correspondingly spaced openings extending diametrically therethrough and means for causing rotation of said tubular members relative to one another for varying the alignment of their respective openings.

3. A stick manipulator comprising a main frame structure having a plurality of main tubular members each provided with a series of longitudinally spaced openings extending therethrough, a second tubular member adapted to be freely mounted concentrically of each of said main tubular members and each having a series of correspondingly spaced openings extending therethrough, and means for causing rotation of one series of tubular members relative to the other series for varying the alignment of their respective openings.

4. A stick manipulator comprising a main frame structure having a plurality of main tubular members each provided with a series of longitudinally spaced openings extending diametrically therethrough, a second separable tubular member adapted to be rotatably mounted concentrically of each of said main tubular members and each having a series of correspondingly spaced openings extending diametrically therethrough, and means for causing rotation of one series of tubular members relative to the other series for varying the alignment of their respective openings.

5. A stick manipulator comprising a main frame structure having a plurality of main fixed tubular members each provided with a series of longitudinally spaced openings extending diametrically therethrough, a second separable tubular member adapted to be mounted rotatably concentrically within each of said main fixed tubular members and each having a series of correspondingly spaced openings extending diametrically therethrough, and means for causing rotation of said separable tubular members relative to said fixed tubular members for varying the alignment of their respective openings.

6. A stick manipulator comprising a main frame structure having a plurality of main fixed tubular members each provided with a series of longitudinally spaced openings extending diametrically therethrough, a second separable tubular member adapted to be mounted rotatably concentrically within each of said main fixed tubular members and each having a series of correspondingly spaced openings extending diametrically therethrough, means for connecting operatively said separable tubular members together as a unit, and actuating means operatively associated with said connecting means for causing rotation of said separable tubular members relative to said fixed tubular members for varying the alignment of their respective openings.

7. A stick manipulator comprising a main frame structure having a plurality of main tubular members each provided with a series of longitudinally spaced openings extending therethrough, a second tubular member adapted to be freely mounted concentrically of each of said main tubular members and each having a series of correspondingly spaced openings extending therethrough, means for connecting one series of tubular members operatively together, and actuating means for operating said connecting means for causing rotation of one series of tubular members relative to the other series of tubular members for varying the alignment of their respective openings.

8. A portable stick manipulator comprising a main frame structure and being provided with a plurality of main fixed tubular members each having a series of longitudinally and vertically spaced openings extending diametrically therethrough, a plurality of second separable tubular members one of which is adapted to be mounted concentrically within each of said main fixed tubular members and each having a series of correspondingly spaced openings extending diametrically therethrough, said separable tubular members each having fixed means adjacent one end for operating the same, and actuating means associated with said operating means for causing rotation of said separable member with respect to its fixed member for wedgingly locking a handle member therebetween.

9. A portable stick manipulator comprising a main frame structure and being provided with a plurality of main fixed tubular members each having a series of longitudinally and vertically spaced openings extending diametrically therethrough, a plurality of second separable tubular members one of which is adapted to be mounted concentrically within each of said main fixed tubular members and each having a series of correspondingly spaced openings extending diametrically therethrough, said separate tubular member each having integral means adjacent one end for connecting the same operatively with the other separable members, and actuating means connected operatively with said integral means for operating said member to cause relative movement respecting their fixed members for wedgingly clamping a handle member therebetween.

10. A portable stick manipulator comprising a main frame structure and being provided with a plurality of main fixed tubular members each having a series of longitudinally and vertically spaced openings extending diametrically therethrough, a plurality of second separable tubular members one of which is adapted to be mounted concentrically within each of said main fixed tubular members and each having a series of correspondingly spaced openings extending diametrically therethrough, said separable tubular members each having fixed means adjacent one end for operating the same, one of said members having a yolk for receiving an actuating cam member, and an actuating means including a cam member for causing all of said separable tubular members to be moved in unison with respect to their respective fixed tubular members for varying the alignment of their respective opening.

11. A stick manipulator comprising a main frame structure having a plurality of main fixed tubular members each being open on one end and having a series of longitudinally spaced openings extending diametrically therethrough, a second separable tubular member adapted to be rotatably mounted concentrically through said open end within each of said main fixed tubular members and each having a series of correspondingly spaced openings extending diametrically therethrough, and means for causing rotation of said separable tubular members within said fixed tubular members for varying the alignment of their respective openings.

12. A stick manipulator comprising a main frame structure having a plurality of main fixed tubular members each being open on one end and having a series of longitudinally spaced openings extending diametrically therethrough, a second separable tubular member adapted to be rotatably mounted telescopically through said open end within each of said main fixed tubular members and each having a series of correspondingly spaced openings extending diametrically therethrough, said separable tubular members each having means fixed adjacent its outer end for connecting the same operatively with the corresponding means of the other separable members, and actuating means connected operatively to one of the means of one of said tubular members for causing relative movement between said respective tubular members for varying the alignment of their respective openings.

13. A stick manipulator comprising a main frame structure having a main fixed tubular member provided with a series of longitudinally spaced openings extending diametrically therethrough, a second separable tubular member adapted to be freely mounted concentrically of said main tubular member and having a series of correspondingly spaced openings extending diametrically therethrough, and means for moving said tubular members relative to one another whereby the handle members are wedgingly locked therebetween in a plurality of spaced positions.

14. A stick manipulator comprising a main frame structure having a plurality of main tubular members each provided with a series of longitudinally and vertically spaced openings extending therethrough, a second tubular member adapted to be freely mounted telescopically of each of said main tubular members and each having a series of correspondingly spaced openings extending therethrough, and means for causing relative movement between the openings of each member for causing the handle members positioned therein to be locked wedgingly in a plurality of spaced positions.

15. A stick manipulator comprising a main frame structure having a plurality of main fixed tubular members each being provided with a series of longitudinally spaced openings extending therethrough, said openings being of substantially the size and shape of the handle member to be positioned therein, a second tubular member adapted to be freely mounted telescopically within each of said main tubular members and each having a series of correspondingly spaced openings extending therethrough, the opening in said second tubular member being substantially larger than the openings in said fixed tubular members and having at least one side oblique to the sides of the openings in said main tubular member, and means for causing rotation of the second tubular members within the main tubular members for varying the alignment of their respective openings and to cause an oblique side to close a portion of the opening in the main tubular member to clamp wedgingly against an opposite end and side a handle stick extending therethrough.

16. A stick manipulator comprising a main frame structure having spaced handles for manipulating the same and being provided with a plurality of main fixed tubular members each being provided with a series of longitudinally spaced openings extending therethrough, said openings being of substantially the size and shape of the handle member to be positioned therein, a second tubular member adapted to be freely mounted concentrically within each of said main tubular members and each having a series of correspondingly spaced openings extending therethrough, the openings in said second tubular member being substantially larger than the openings in said fixed tubular members and having at least one side oblique to the sides of the openings in said main tubular member, means for connecting said second tubular members operatively together as a unit, and actuating means connected with said operating means for actuating said second tubular member within said main tubular member whereby said oblique side is moved over a portion of the opening in the main tubular member to clamp wedgingly against an opposite end and side a handle stick extending therethrough.

NORMAN M. THOMAS.